United States Patent
Asao et al.

(10) Patent No.: US 10,177,612 B2
(45) Date of Patent: Jan. 8, 2019

(54) MOTOR WITH STATOR FIXING STRUCTURE

(75) Inventors: Yoshihito Asao, Tokyo (JP); Isao Sonoda, Tokyo (JP); Kohei Ushio, Tokyo (JP); Satoru Akutsu, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 14/234,512

(22) PCT Filed: Oct. 6, 2011

(86) PCT No.: PCT/JP2011/073072
§ 371 (c)(1),
(2), (4) Date: Jan. 23, 2014

(87) PCT Pub. No.: WO2013/051126
PCT Pub. Date: Apr. 11, 2013

(65) Prior Publication Data
US 2014/0145548 A1    May 29, 2014

(51) Int. Cl.
*H02K 1/18* (2006.01)
*H02K 5/02* (2006.01)
*H02K 5/06* (2006.01)

(52) U.S. Cl.
CPC .............. *H02K 1/185* (2013.01); *H02K 5/06* (2013.01); *H02K 1/18* (2013.01); *H02K 5/02* (2013.01)

(58) Field of Classification Search
CPC ............ H02K 1/18; H02K 1/185; H02K 1/02; H02K 5/00; H02K 5/02; H02K 5/04; H02K 5/06

(Continued)

(56) References Cited

U.S. PATENT DOCUMENTS 3,772,538 A * 11/1973 Supitilov .............. B06B 1/0618
310/325
5,952,751 A * 9/1999 Yamakoshi .............. H02K 5/04
29/596

(Continued)

FOREIGN PATENT DOCUMENTS

FR    2596929 A1    10/1987
JP    54-30207 U    2/1979

(Continued)

OTHER PUBLICATIONS

JP2009060760 English Translation.*

(Continued)

*Primary Examiner* — Joshua Benitez Rosario
*Assistant Examiner* — Alexander Moraza
(74) *Attorney, Agent, or Firm* — Sughrue Mion, PLLC; Richard C. Turner

(57) ABSTRACT

A material of the stator core is different from a material of the housings, in a state where one end portion in the axis direction of the stator core is contacted to the first housing, and the other end portion in the axis direction of the stator core is contacted to the second housing; and a neighboring portion of a contact portion, at which the first housing is contacted to the stator core, and another neighboring portion of a contact portion, at which the second housing is contacted to the stator core, are connected by a connecting component in the axis direction, of which material is the same as a material of the stator core, whereby the first housing and the second housing are connected each other; and the first housing and the second housing face each other in a state where a gap intervenes between both housings.

5 Claims, 3 Drawing Sheets

(58) Field of Classification Search
USPC .... 310/216.114, 216.135, 216.133, 216.118, 310/216.131, 216.113, 216.085, 216.127, 310/89, 51, 85, 427, 402, 403, 405, 408, 310/410, 411, 413, 415, 418, 422, 433, 310/216.128, 91, 216.115, 216.129, 310/216.134, 432; 248/650; 403/337
See application file for complete search history.

(56) References Cited

U.S. PATENT DOCUMENTS

| | | | |
|---|---|---|---|
| 6,023,838 A * | 2/2000 | Yamakoshi | H02K 5/04 29/596 |
| 6,927,520 B2 * | 8/2005 | Okawa | H02K 5/15 310/216.001 |
| 2002/0047476 A1 | 4/2002 | Okawa | |
| 2004/0124731 A1 | 7/2004 | Kimura et al. | |
| 2005/0264111 A1 * | 12/2005 | Tanaka | B62J 6/12 310/75 C |
| 2008/0106163 A1 * | 5/2008 | Mizuno | B60K 6/365 310/83 |
| 2009/0200887 A1 * | 8/2009 | Okamoto | H02K 1/185 310/195 |
| 2011/0080064 A1 * | 4/2011 | Kudose | H02K 5/04 310/89 |
| 2012/0242186 A1 | 9/2012 | Hattori | |

FOREIGN PATENT DOCUMENTS

| | | | |
|---|---|---|---|
| JP | 54030207 U | * | 2/1979 |
| JP | 4-364339 A | | 12/1992 |
| JP | 2004-112988 A | | 4/2004 |
| JP | 2009-060760 A | | 3/2009 |
| JP | 2009060760 A | * | 3/2009 |
| JP | 2010-259315 A | | 11/2010 |
| WO | 2011/080817 A1 | | 7/2011 |

OTHER PUBLICATIONS

JP 54030207 U (English Translation).*
Communication dated Aug. 19, 2014 from The Japanese Patent Office in counterpart Japanese Patent Application No. 2013537328.
Communication dated Feb. 24, 2016 from the European Patent Office in counterpart application No. 11873781.6.

* cited by examiner (a)

(b)

MOTOR WITH STATOR FIXING STRUCTURE

CROSS REFERENCE TO RELATED APPLICATIONS

This application is a National Stage of International Application No. PCT/JP2011/073072, filed on Oct. 6, 2011, the contents of all of which are incorporated herein by reference in their entirety.

TECHNICAL FIELD

The present invention particularly relates to a structure for holding and fixing a stator core to a housing in a motor.

BACKGROUND ART

In conventional and particular inner-rotor-type motors, a stator and a rotor are included in a state where a plurality of coils is wound around a stator core of the stator, and the rotor is rotated in the stator core. Therefore, the rotor as well as the stator core must be accurately held at predetermined positions. When a housing is provided in order to fix both components, and the stator core as well as the housing are made from the same iron-group materials, the stator core is press-inserted or fitted into the housing, whereby the stator core can be easily fixed to the housing. However, when the both components are made from different materials, for example, iron and aluminum, a fitting configuration, in which a specification environment as well as an influence of self-heating are considered, is required.

CONVENTIONAL ART DOCUMENT

Patent Document

Patent Document 1: Japanese Laid-Open Patent Publication No. 2004-112988

SUMMARY OF THE INVENTION

Problems to be Solved by the Invention

In the stator core and the housing described in Patent Document 1, the shape of the housing is not a perfect circle in order to prevent a problem, such as a crack having a possibility, which is caused because heat-expansion coefficients are different in accordance with a difference between materials of the both component, and the housing has an uneven shape in a state where a gap between the housing and the stator core is greatly changed.

The components have a configuration in which a convex portion is elastically deformed and absorbed, by the gap caused by the uneven shape, in accordance with a difference between the both heat-expansion coefficients. In other words, the shape of the housing corresponds to the heat-expansion coefficient in diameter direction, but it does not correspond to the difference between the both heat-expansion coefficients in axis direction. Although it is estimated that the components slightly correspond to the difference between the both heat-expansion coefficients because a gap intervenes between the housing and the stator core in the conventional device, the position in axis direction has not been determined. Therefore, the present invention has been made to provide a motor in which the components can correspond to a difference between a material of the housing and a material of the stator core, and the stator core can be certainly held and fixed in the housing.

Means for Solving Problems

A motor of the present invention includes an annular-shaped stator including a stator core on which a coil is wound; and a rotor including a shaft, which is rotatably installed at a center of the stator; in which a first housing and a second housing, which are separated in a shaft direction of the rotor so as to be faced, and install the stator and the rotor, are included; and a material of the stator core is different from a material of the housings, in a state where one end portion in axis direction of the stator core is contacted to the first housing, and the other end portion in axis direction of the stator core is contacted to the second housing; and a neighboring portion of a contact portion, at which the first housing is contacted to the stator core, and another neighboring portion of a contact portion, at which the second housing is contacted to the stator core, are connected by a connecting component in axis direction, of which material is the same as a material of the stator core, whereby the first housing and the second housing are connected each other; and the first housing and the second housing are faced to each other in a state where a gap intervenes between the both housings.

Moreover, another motor of the present invention includes an annular-shaped stator including a stator core on which a coil is wound; and a rotor including a shaft, which is rotatably installed at a center of the stator; in which a housing, of which material is different from a material of the stator core, which includes a contact portion contacting to one end portion in axis direction of the stator core and a peripheral wall surrounding the stator core extended from a neighboring portion of the contact portion, is included; and a connecting component in axis direction, of which material is the same as a material of the stator core and a holder having a contact portion contacted to the other end portion in axis direction of the stator core, which connects the neighboring portion of the contact portion, at which the housing is contacted to one end portion of the stator core, and a neighboring portion of the contact portion, at which the holder is contacted to the other portion of the stator core, is included; and the neighboring portion of the contact portion of the housing is connected to the neighboring portion of the contact portion of the holder by the connecting component in axis direction so as to connect the housing, the stator core, and the holder; and the holder is held to the housing by contacting an outer circumference surface in diameter direction of the holder to the peripheral wall of the housing in a state where a gap intervenes between the holder and the peripheral wall of the housing, which faces to the holder in axis direction of the holder.

Furthermore, another motor of the present invention includes an annular-shaped stator including a stator core on which a coil is wound; and a rotor including a shaft, which is rotatably installed at a center of the stator; in which a yoke, of which material is the same as a material of the stator core, is provided on the stator core in a state where the yoke surrounds the stator core so as to be fixed to the stator core, and includes a plurality of flanges at one end portion in axis direction of the stator core; and a housing for installing the stator and the rotor, of which material is different from a material of the stator core, surrounds the stator core and the yoke, and is partly contacted to an outer circumference surface of the yoke facing to an inner circumference surface of the housing in a state where a gap intervenes between the outer circumference surface and the inner circumference surface; and flanges of the housing, which are formed in such a way that the flanges face to the flanges of the yoke, are fixed to the flanges of the yoke by connecting components in axis direction.

Effects of the Invention

According to the motor of the present invention, one end portion in axis direction of the stator core is contacted to the first housing, and the other end portion in axis direction of the stator core is contacted to the second housing, and moreover, a neighboring portion, at which the first housing is contacted to the stator core, and another neighboring portion, at which the second housing is contacted to the stator core, are connected by a connecting component in axis direction, of which material is the same as a material of the stator core, so as to connect both housings in a state where a gap intervenes between the both housings, so that a motor can be realized in which the components can correspond to a difference between a material of the housing and a material of the stator core, and the stator core is certainly held and fixed.

Moreover, according to the motor of the present invention, the neighboring portion of the contact portion of the housing is connected to the neighboring portion of the contact portion of the holder by the connecting component in axis direction so as to connect the housing, the stator core, and the holder; and the holder is held to the housing by contacting an outer circumference surface in diameter direction of the holder to the peripheral wall of the housing in a state where a gap intervenes between the holder and the peripheral wall of the housing, which faces to the holder in axis direction of the holder, so that a motor can be realized in which the components can correspond to a difference between a material of the housing and a material of the stator core, and the stator core is certainly held and fixed.

Furthermore, according to the motor of the present invention, a yoke, of which material is the same as a material of the stator core, is provided on the stator core in a state where the yoke surrounds the stator core so as to be fixed to the stator core, and includes a plurality of flanges at one end portion in axis direction of the stator core; and a housing, of which material is different from a material of the stator core, for installing the stator and the rotor surrounds the stator core and the yoke, and is partly contacted to an outer circumference surface of the yoke facing to an inner circumference surface of the housing in a state where a gap intervenes between the outer circumference surface and the inner circumference surface; and flanges of the housing, which are formed in such a way that the flanges face to the flanges of the yoke, are fixed to the flanges of the yoke by connecting components in axis direction, so that a motor can be realized in which the components can correspond to a difference between a material of the housing and a material of the stator core, and the stator core is certainly held and fixed.

An object, a characteristic, a viewpoint, and an effect, except for those described above, of the present invention will be more circumstantially described by the detail following explanation of the present invention, which refers the drawings.

MODE FOR CARRYING OUT THE INVENTION

Embodiment 1

Figure 1:
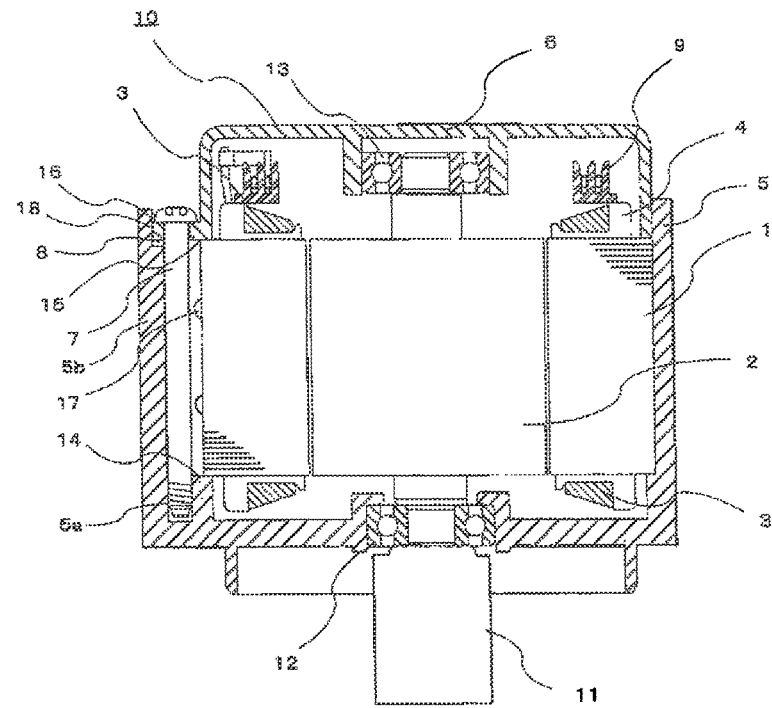
FIG. 1 is a longitudinal cross-sectional view illustrating a motor according to Embodiment 1 of the present invention.

Embodiment 1 of the present invention will be explained in reference to the drawings. FIG. 1 is a longitudinal cross-sectional view illustrating a motor 10 according to Embodiment 1 of the present invention. A plurality of magnetic sheets are laminated in a stator core 1 of a stator having an annular shape, and a coil winding 3 is wound around a bobbin 4. Moreover, a predetermined wire connection is performed by a terminal 9 at the end portion of the coil winding 3. On the other hand, a rotor 2 is coaxially arranged along a central axis of the stator core 1 at a center of the stator core 1 in a state where a gap intervenes between the stator core 1 and the rotor 2, whereby the rotor 2 is hold by two bearings 12 and 12, and the rotor 2 can be freely rotated. Moreover, a plurality of permanent magnets (not illustrated) is regularly arranged in the rotor 2.

The stator core 1 is surrounded by housings 5 and 6 which are made from aluminum. The stator core 1 is positioned and fixed by installing the stator core 1 into the housings 5 and 6. Hereinafter, the outside of a shaft 11 of the rotor 2 is called the front side (lower side in FIG. 1), and the reverse side is called the rear side. The housings 5 and 6 are composed of the front housing 5 and the rear housing 6, and the both housings surround the stator and the rotor 2. In the both housings 5 and 6, many kinds of components in FIG. 1, for example, bearings 12 and 13, and a control unit (not illustrated), which supplies current to the coil winding 3, are installed, whereby manifold shapes are required for the housings. Therefore, the housings are made from aluminum, and it is maintained that the housings are easily formed. Moreover, when the motor 10 is driven, great heat is generated in accordance with flowing current through the coil winding 3, and the housings having a suitable radiation capability, so that the both housings 5 and 6 made from aluminum (or aluminum alloy) having a suitable heat-transfer capability, which is different from an iron-group material (or iron-group alloy) of the stator core 1, are used.

A partial portion (contact portion) 14 of the front housing 5 is contacted to one end portion in axis direction of the stator core 1, and a partial portion (contact portion) 14 of the rear housing 6 is contacted to the other end portion in axis direction of the stator core 1. A plurality of flanges 16 (for example, three or four pieces) is extended from the contact portion 15 (or a neighboring portion of the contact portion 15), which is contacted to the other end portion in axis direction of the stator core 1, in diameter direction of the rear housing 6 so as to be arranged. Holes for through bolts 7 are formed at the flanges 16. On the other hand, screw holes 5a for through bolts 7 are formed at the contact portion 14 (or a neighboring portion of the contact portion 14) of the front housing 5.

The both housings 5 and 6 are respectively connected to the holes of the flanges 16 and the screw holes 5a by inserting and tightening the through bolts 7 (connecting components in axis direction). In other words, the neighboring portion of the contact portion 14, at which the front housing 5 is contacted to the stator core 1, and the neighboring portion of the contact portion 15, at which the rear housing 6 is contacted to the stator core 1, are connected by the connecting components in axis direction, whereby the both housings 5 and 6 are connected. Etch of the through bolts 7 has a length which is longer than a length in axis direction of the stator core 1. The connecting components in axis direction are made from an iron-group material (iron-group alloy) which is the same kind of material of the stator core 1. The stator core 1 is positioned and fixed by the both housings 5 and 6 in accordance with the above-described configuration. The connecting components in axis direction may be made of through bolts or clip-shaped components of which lengths are long (refer to FIG. 6 (*b*)).

In the above-described brushless motor, an expansion amount of an iron-group stator core (for example, a diameter of the stator core is 90 mm, and a height of the laminated steel sheets is 65 mm) is compared with an expansion amount of the aluminum housings 5 and 6 which are made from aluminum. When a linear expansion coefficient of iron-group metals is "$1.2 \times 10^{-5}/°$ C.", and a linear expansion coefficient of aluminum-group metals is "$2.1 \times 10^{-5}/°$ C.", and an environmental temperature is changed from a low temperature "−40° C." to a high temperature "125° C." with respect to an ordinary temperature "25° C.", the expansion mounts in axis direction are calculated by the following formula.

$$65 \times (125-25) \times 2.1 \times 10^{-5} = 0.137 \text{ mm}$$

$$65 \times (125-25) \times 1.2 \times 10^{-5} = 0.078 \text{ mm}$$

$$65 \times (25-(-40)) \times 2.1 \times 10^{-5} = 0.089 \text{ mm}$$

$$65 \times (25-(-40)) \times 1.2 \times 10^{-5} = 0.051 \text{ mm}$$

The expansion mounts in diameter direction are calculated by the following formula.

$$90 \times (125-25) \times 2.1 \times 10^{-5} = 0.189 \text{ mm}$$

$$90 \times (125-25) \times 1.2 \times 10^{-5} = 0.108 \text{ mm}$$

$$90 \times (25-(-40)) \times 2.1 \times 10^{-5} = 0.123 \text{ mm}$$

$$90 \times (25-(-40)) \times 1.2 \times 10^{-5} = 0.070 \text{ mm}$$

As a result, an approximate difference in axis direction is 0.06 mm, and an approximate difference in diameter direction is greater than or equal to 0.08 mm. Therefore, there is a problem related to the strength of the aluminum component, and particularly related to the strength of screw threads (screw threads of the screw holes 5a of the front housing 5 to which the through bolts 7 are inserted) illustrated in FIG. 1, and there is a possibility in which through bolts 7 are loosened. Therefore, in order to prevent facing portions of the both housings 5 and 6 from contacting, a short gap 8 is provided. In FIG. 1, a peripheral wall 5b of the front housing 5, which is extended from the contact portion 14 (or the neighboring portion of the contact portion 14) of the front housing 5 and surrounds the stator core 1, is faced to the flanges 16 of the rear housing 6. A recess is formed in the axial end face of the peripheral wall 5b, and the recess is deep enough that the gap 8 intervenes in the axial direction between the bottom of the recess and the flanges 16.

The through bolts 7 and the stator core 1 are made from the same kind of material, for example, those are made of iron-group components, and have an equivalent linear expansion coefficient. The front housing 5 is expanded by heat, and it is more expanded than the iron-group components. Therefore, when the facing portions of the housings 5 and 6 are contacted each other, a deviation "0.06 mm" is caused by calculation. Here, the expansion of the front housing 5 made from aluminum is allowed by forming the gap 8, and a width of the gap 8 may be about 0.1 mm when the stator has the above-described size.

Moreover, an expansion deviation is similarly is caused in diameter direction, whereby a wider gap is formed, at a high temperature, between an inner circumference surface of the peripheral wall 5b of the housing 5 and an outer circumference surface of the stator core 1, and the housing 5 is pushed and expanded, at a low temperature, by the stator core 1. Therefore, it is basically desirable that an internal diameter of the housing 5 is longer than an external diameter of the stator core 1 in state where the difference between the both diameters is about 0.06 mm. However, when a position deviation in diameter direction of the stator core 1 is considered, it is desirable that a plurality of positions, at which the inner circumference surface of the housing equal to the external diameter of the stator core, is partially formed. It is desirable that protrusions or pleats in a circumferential direction are provided at the plurality of positions. The protrusions may be provided at the inner circumference surface of the housing 5 or at the outer circumference surface of the stator core 1. Moreover, when the motor is used at low temperature in a condition where the housing 5 has sufficient strength, the inner circumference surface of the peripheral wall 5b of the housing 5 may be contacted to the outer circumference surface of the stator core 1.

In FIG. 1, the front housing 5 surrounds one end portion and the outer circumference surface in axis direction of the stator core 1, and the rear housing 6 surrounds the other end portion of the stator core 1. However, in a reverse way, the motor may have a configuration in which the rear housing 6 surrounds the outer circumference surface in axis direction of the stator core 1, and the front housing 5 has a shape being similar to a shape of the rear housing 6. In this case, the through bolts 7 are inserted from the front housing 5 side to the rear housing 6, and the gap 8 is formed at a flange of the front housing 5. It may be determined by considering a positional relation for the control unit, an output direction of the end portion of the coil winding, or an assembly capability of the motor 10 that any one of the configurations is adopted. Moreover, when the motor 10 has a housing configuration illustrated in FIG. 1, only the rear housing 6 may be not made from aluminum, but may be made from iron-group metals.

In addition, a gap is formed under the flanges 16, so that strength of the flange 16 in itself is required. Therefore, although the strength is maintained by a thickness of the flange 16, when a required thickness is not maintained, it is suitable that a size of each of the housings is determined in such a way that the outer circumference surface in diameter direction of the flange is contacted to the inner circumference surface 18 of the front housing 5. In FIG. 1, a notch is formed at a tip side (at the rear housing 6 side) of the peripheral wall 5b of the front housing 5, and an inner circumference surface 18 of the notch is contacted to an outer circumference surface of the flange 16. On the portions except for the flange 16, the inner circumference surface of the front housing 5 is contacted to the outer circumference surface of the rear housing 6 at a position where the front housing 5 and the rear housing 6 are overlapped in axis direction.

Moreover, a control unit of the motor 10, for example, an inverter circuit or the like, can be mounted on an upper portion, illustrated in FIG. 1, of the rear housing 6, or can be mounted on a lower portion, illustrated in FIG. 1, of the front housing 5. In order to easily mount the control unit, the housings are made from aluminum, whereby a forming capability for an arbitrary shape and a radiation capability the control unit can be improved.

Embodiment 2

Figure 2:
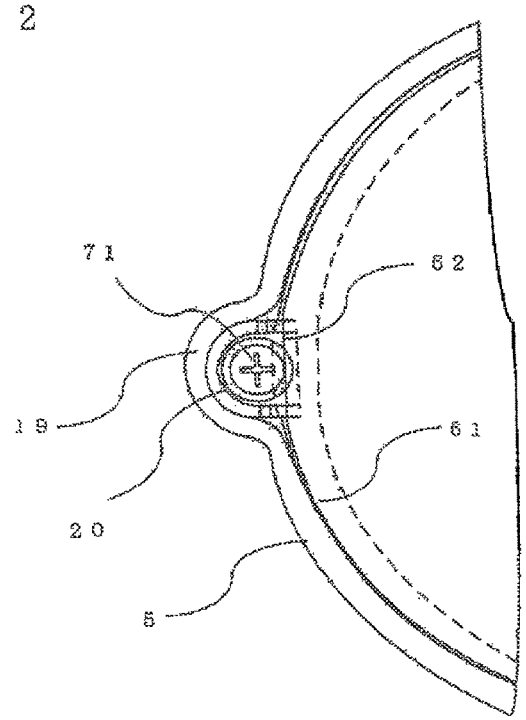
FIG. 2 is a partial plane view illustrating a main portion of a motor according to Embodiment 2 of the present invention.
Figure 3:
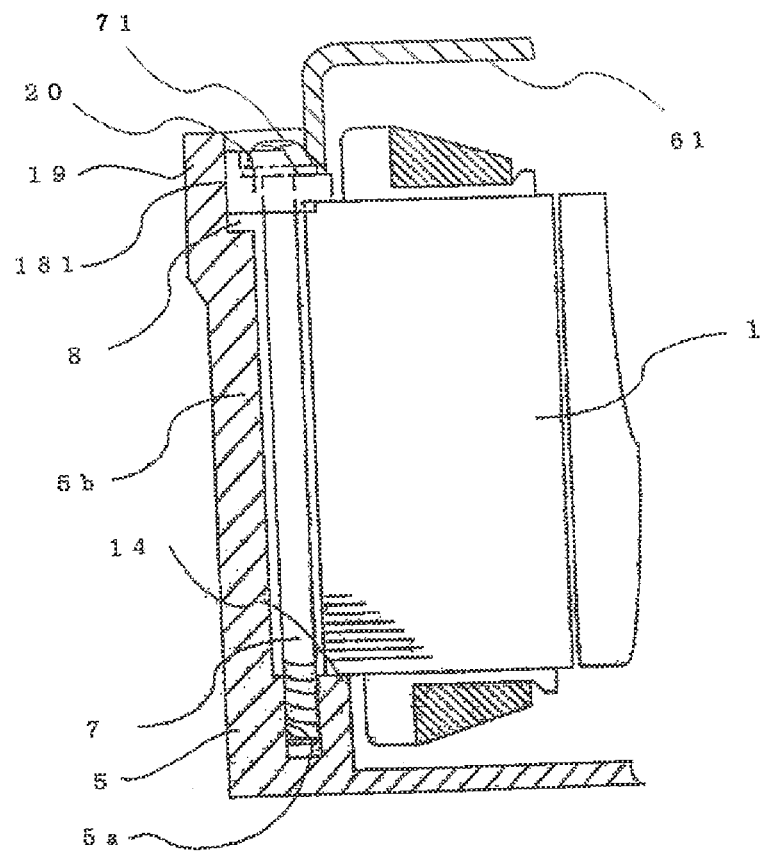
FIG. 3 is a partial longitudinal cross-sectional view illustrating the main portion of the motor according to Embodiment 2 of the present invention.
Figure 4:
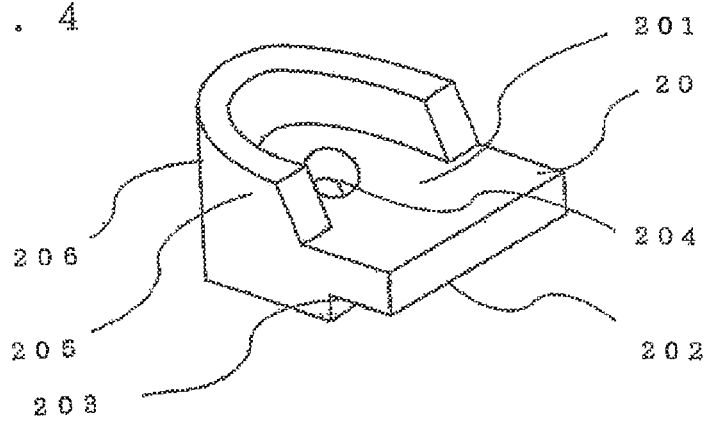
FIG. 4 is an oblique perspective view illustrating a holder used for the motor according to Embodiment 2 of the present invention.

Hereinafter, Embodiment 2 of the present invention will be explained. FIG. 2 is a partial plane view illustrating a main portion of a motor according to Embodiment 2 of the present invention, and the main portion is viewed from an upper side to a lower side in FIG. 3. FIG. 3 is a partial longitudinal cross-sectional view illustrating the main portion of the motor according to Embodiment 2 of the present invention. FIG. 4 is an oblique perspective view illustrating a holder used for the motor according to Embodiment 2 of the present invention. A front housing 5 includes a contact portion 14, which is contacted to one end portion in axis direction of a stator core 1, and a peripheral wall 5b, which is extended from a neighboring portion of the contact portion 14 so as to surround the stator core 1 and a stator, and is made from aluminum (or aluminum ally) which is different from a material of the stator core 1. A holder 20 includes contact portions 202 and 203, which are contacted to the other end portion in axis direction of the stator core 1, and is made from a material, which is the same as a material of the stator core 1 or the front housing 5, or from a synthetic resin material.

At a tip side (holder 20 side) of the peripheral wall 5b of the front housing 5, protrusions 19 extended in diameter direction are provided at multi-positions (for example, three positions) which are equally divided in a circumferential direction of the stator core 1. An inner circumference side of each protrusion 19 is notched so as to install the holder 20. The holder 20 includes a wall 205 in a state where an outer circumference surface 206 in diameter direction is contacted to an inner circumference surface 181 of the protrusion 19 of the peripheral wall 5b, and the holder 20 is held by the protrusion 19 of the peripheral wall 5b of the front housing 5, and moreover, a gap 8 intervenes between the older 20 and the peripheral wall 5b of the front housing 5 facing in axis direction of the older 20.

Through bolts 7 (connecting components in axis direction) is made from a material being the same as a material of the stator core 1. A screw hole 5a for the through bolt 7 is formed at the contact portion 14 (or a neighboring portion of the contact portion 14) on which the front housing 5 is attached to the one end portion of the stator core 1. A hole 204 for the through bolt 7 is formed at a washer 201 of the contact portion 202 (or a neighboring portion of the contact portion 202) on which the holder 20 is attached to the other end portion of the stator core 1. The neighboring portion of the front housing 5 is connected to the neighboring portion of the holder 20 by inserting the through bolts 7 into the hole 204 and the screw hole 5a and by tightening the through bolts 7, whereby the front housing 5, the stator core 1, and the holder 20 are connected.

As described above, even when the stator core 1 is fixed to the front housing 5 by using a plurality of holders 20 being different from a rear housing 61, the gap 8 intervenes between the holders 20 and the peripheral wall 5b of the front housing 5, which faces the holders 20 in axis direction, so that expansion and contraction, which are caused by heat, of the peripheral wall 5b can be absorbed by the gap 8. Moreover, the holders 20 are installed in the protrusions 19 of front housing 5, whereby the holders 20 can be positioned before those are tighten by the through bolts 7, and then, the holders 20 can prevent the front housing 5 from being rotated when the through bolts 7 are tightened. Moreover, in order to secure a contact area for contacting the inner circumference surface 181 of the protrusions 19 to the outer circumference surface 206 in diameter direction of the holders 20, the wall 205 is formed in the holders 20. Therefore, when the contact area of the outer circumference surface 206 of the holders 20 can be secured by a thickness of in axis direction of the holders 20, the wall 205 is not necessary.

Moreover, dimensional accuracy of the contact portion 203 (inner circumferential surface in diameter direction) in each holder 20 toward the stator core 1 is not required.

An angle portion of the contact portion 203 is used for positioning the holder 20 before the holder 20 is tightened to the front housing 5, and it is not required that the angle portion is contacted to the outer circumference surface of the stator core 1 after the through bolts 7 are tightened. The rear housing 61 has a cylindrical shape except for neighboring portions of the holder 20, and a partial portion of the neighboring portions of the holder 20 has a linear shape 62 in order to have looseness corresponding to a head 71 of each through bolt 7. The rear housing 61 is fixed to the front housing 5 or the stator core 1, and can be fixed without having much relation with expansion and contraction, so that the rear housing 61 can be configured by a conventional method, for example, a fitting method or a tightening method by bolts.

Embodiment 3

Figure 5:
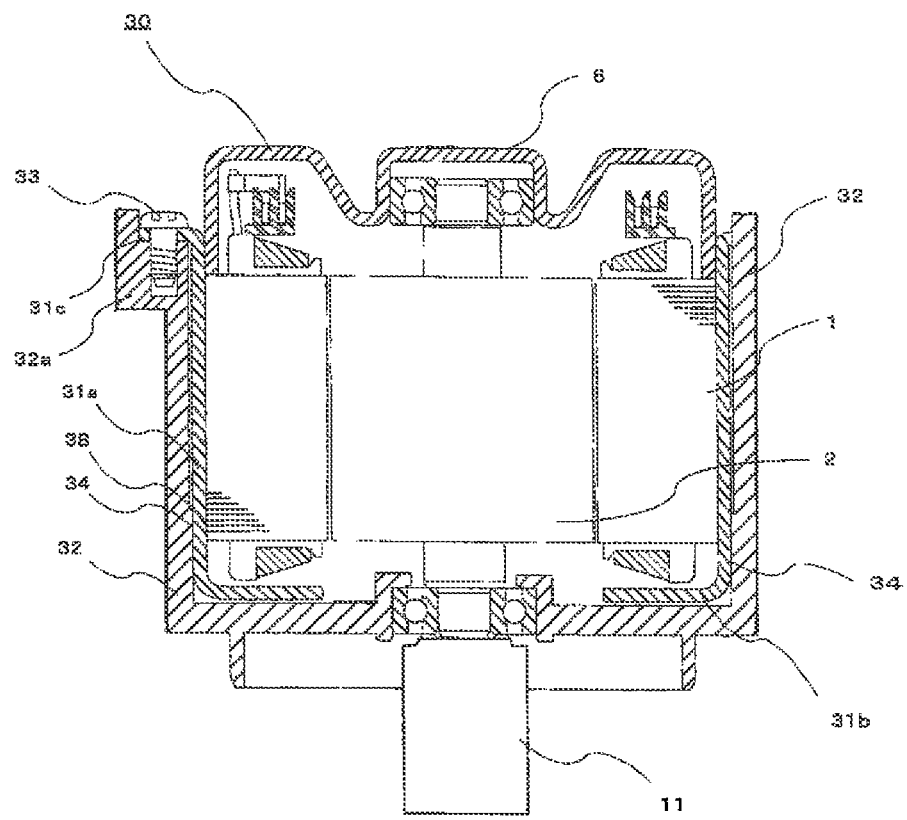
FIG. 5 is a longitudinal cross-sectional view illustrating a motor according to Embodiment 3 of the present invention.

Hereinafter, Embodiment 3 of the present invention will be explained by using FIG. 5, and differences between FIG. 5 and FIG. 1 according to Embodiment 1 will be particularly explained. FIG. 5 is a longitudinal cross-sectional view illustrating a motor according to Embodiment 3 of the present invention. A motor 30 is surrounded by a housing 6 and a housing 32, which are made from aluminum, and a partial portion of the stator core 1 is covered by a yoke 31a. The yoke 31a and a stator core 1 have the same kind of material, for example, an iron-group material, and have an equivalent linear expansion coefficient. The yoke 31a made from iron has a cylindrical shape in which both end portions are opened, and a plurality of flanges 31c (only one flange is illustrated in FIG. 5) are provided at one end portion in axis direction of the stator core 1. The yoke 31a and the stator core 1 are tightened and fixed by, for example, a press-inserting operation.

Moreover, the front housing 32 also includes flanges 32a, and the flanges 32a have a positioning relation for being able to contact to the flanges 31c of the yoke 31a. The both flanges 31c and 32a are tightened and fixed by bolts 33 which are shorter than the bolts the bolts according to Embodiment 1, and shorter than a length in axis direction of the stator core 1. Although the other end portion 31b of the yoke 31a is extended from an outer circumference surface of the other end portion of the stator core 1 to a center axis side, the other end portion 31*b* is not contacted to a bottom portion of the front housing 32. Thereby, a heat-expansion difference between the bottom portion of the front housing 32 and the other end portion 31*b* of the yoke 31*a* can be allowed. The outer circumference surface of the yoke 31*a* and the inner circumference surface of the front housing 32 are mostly faced in a state where a very short gap intervenes between the both surfaces, and the both surfaces are contacted at only partial portions. Thereby, the outer circumference surface of the yoke 31*a* and the inner circumference surface of the front housing 32 are relatively and easily deviated with respect to the expansion and the contraction which are caused by a linear-expansion-coefficient difference.

A contact portion for contacting the yoke 31*a* and the front housing 32 is only a partial portion (contact portion) 34 of the outer circumference surfaces of the flanges 31*c* and 32*a* and the yoke 31*a*. Moreover, the inner circumference surfaces of the front housing 32, the contact portion (contact portion) 34 of the yoke 31*a*, and a tight position 38 for tightening the yoke 31*a* and the stator core 1 are overlapped in axis direction. In other words, it is desirable that the contact portion 34 is formed at a position where the yoke 31*a* and the stator core 1 are tightened in axis direction. Thereby, strength of the components is enhanced. When it is feasible that the yoke 31*a* and the stator core 1 are tightened in a state where those have a width being wider than a few laminated magnetic steel sheets, and the contact portion 34 is formed at the tightened portion, high endurance is obtained. Each of components can be certainly held by applying the above-described configuration.

As described above, the yoke 31*a* made from an iron-group material is inserted between the stator core 1 and the front housing 32, and then, the yoke 31*a* and the front housing 32 are connected and fixed at one end portion in axis direction of the stator core 1, and only partial portions are contacted, whereby the components can correspond to a difference between a linear expansion coefficient of iron-group metals and a linear expansion coefficient of aluminum. Moreover, although it is explained in the above description that the rear housing 6 is made from aluminum, the rear housing 6 may be made from iron in Embodiment 3. The rear housing 6 is fixed to the stator core 1 by tightening the outer circumference surface of the rear housing 6 to the inner circumference surface of the yoke 31 as illustrate in FIG. 5. Otherwise, a flange, which is similar the flanges 31*c* of the yoke 31*a*, may be formed so as to fix the rear housing 6. Moreover, the control unit of the motor 30 can be installed in the rear housing 6 or the front housing 32 as described in Embodiment 1.

Embodiment 4

Figure 6:
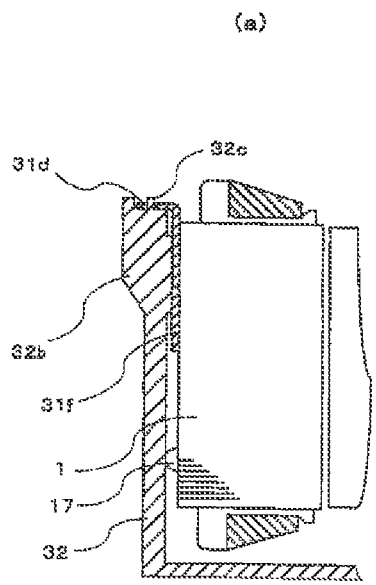
FIG. 6 is a longitudinal cross-sectional view illustrating partial components of a motor according to Embodiment 4 of the present invention.
Figure 6:
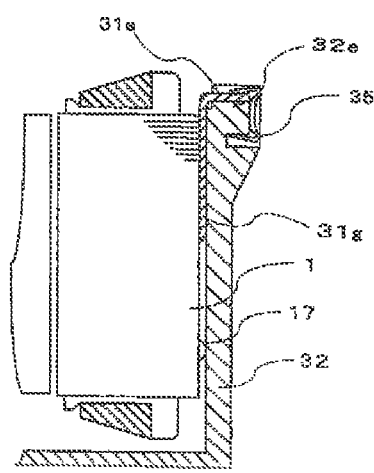

Hereinafter, Embodiment 4 of the present invention will be explained by using FIG. 6. FIG. 6 is a longitudinal cross-sectional view illustrating partial components of a motor according to Embodiment 4 of the present invention, and FIG. 6 (*a*) indicates an example of the motor, and FIG. 6 (*b*) indicates the other example of the motor. Firstly, in FIG. 6 (*a*), a yoke 31*f* having a cylindrical shape is tightened and fixed to a stator core 1, and a plurality of flanges 31*d* is formed at one end portion in axis direction of the stator core 1. A front housing 32 also includes flanges 32*b*, and the both flanges 31*d* and 32*b* are contacted. A hall is formed at a center of each flange 31*d* of the yoke 31*f*, and a protrusion 32*c* formed on the front housing 32 is inserted to the hall. The protrusion 32*c* is tightened, whereby the front housing 32 and the yoke 31*f* are fixed. An inner circumference surface of the front housing 32 is contacted to a partial portion in axis direction of the yoke 31*f*. The outer circumference surface of the stator core 1 is faced to the inner circumference surface of the front housing 32 in a state where a gap intervenes between the both surfaces, and the both surfaces are partially contacted by a pleat or a protrusion 17.

In FIG. 6 (*b*), a flange 31*e* of a yoke 31*g* and a flange 32*e* of the front housing 32 are fixed by a clip 35. The other components are similarly configured as illustrate in FIG. 6 (*a*).

As described above, the yoke 31*f* and the yoke 31*g* may have a cylindrical shape, or may have a shape having a bottom as a conventional device. When the yoke 31*f* and the yoke 31*g* are tightened to the stator core 1 and can hold and fix the stator core 1, the yokes may have minimum lengths. Moreover, the yoke 31*f* and the yoke 31*g* may have shapes by which the yokes are fixed to one end portion in axis direction of the front housing 32, and each of the components can be contacted at a portion of a circumference surface in axis direction.

In addition, in the scope of the present invention, it is possible that each of the embodiments could be freely combined, suitably modified or omitted.

What is claimed is:

1. A motor comprising:
an annular-shaped stator including a stator core on which a coil is wound; and
a rotor including a shaft, which is rotatably installed at a center of the stator, wherein
a first housing and a second housing, which are separated in a shaft direction of the rotor so as to be faced, with the stator and the rotor installed inside, with a contact portion of said first housing contacting one axial end of said stator core at a first contact point and a contact portion of said second housing contacting an opposite axial end of said stator core at a second contact point, and a material of the stator core being different from a material of the housings; and
a neighboring portion of the contact portion of the first housing and a neighboring portion of the contact portion of the second housing being connected by a connecting component in the axis direction, of which material is the same as a material of the stator core, whereby the first housing and the second housing are connected each other; and
wherein the second housing has a plurality of flanges extending in a diameter direction from the neighboring portion of the contact portion of the second housing, wherein a flange of the plurality of flanges is received within a recess formed in the first housing, wherein the flange receives the connecting component, wherein an outer peripheral surface of the flange faces an inner circumferential surface of the recess of the first housing, and a gap having a length and extending from an axially facing surface of the recess of the first housing to a lower surface of the flange of the second housing, the lower surface of the flange providing an upper extent of the gap, and the lower surface of the flange further being contiguous with the contact portion of the second housing such that the contact portion of the second housing and the upper extent of the gap are formed along a common surface and located at the length of the gap away from the axially facing surface of the recess of the first housing, and wherein substantially the entirety of said gap between said axially facing surface of the recess and the lower surface of said flange overlaps at least a part of the stator core in the axial direction of said stator core, to be disposed radially outwardly from said part of the stator core, and wherein the lower surface of said flange is coplanar with said second contact point.

2. A motor as recited in claim 1, wherein a peripheral wall of the first housing, which surrounds the stator core extended from the neighboring portion of the contact portion of the first housing, is faced to the second housing in a state where the gap intervenes in said axial direction between the peripheral wall and the second housing.

3. A motor as recited in claim 2, wherein the plurality of flanges are contacted to the opposite end of the stator core, and the flanges of the second housing are connected, by a bolt used as the connecting component in the axis direction, to the neighboring portion of the contact portion of the first housing, whereby the first housing and the second housing are connected to each other.

4. A motor as recited in claim 3, wherein an inner circumference surface of the peripheral wall of the first housing is contacted to an outer circumference surface of the flanges of the second housing.

5. A motor comprising:
- an annular-shaped stator including a stator core on which a coil is wound; and
- a rotor including a shaft, which is rotatably installed at a center of the stator; wherein
- a first housing and a second housing, which are separated in a shaft direction of the rotor so as to be faced, with the stator and the rotor installed inside, with a contact portion of said first housing contacting one axial end of said stator core at a first contact point and a contact portion of said second housing contacting an opposite axial end of said stator core at a second contact point, and a material of the stator core being different from a material of the housings; and
- a neighboring portion of the contact portion of the first housing and a neighboring portion of the contact portion of the second housing being connected by a connecting component in the axis direction, of which material is the same as a material of the stator core, whereby the first housing and the second housing are connected each other; and wherein the second housing has a plurality of flanges extending in a diameter direction from the neighboring portion of the contact portion of the second housing, wherein a flange of the plurality of flanges is received within a recess formed in the first housing, wherein the flange receives the connecting component, wherein an outer peripheral surface of the flange faces an inner circumferential surface of the recess of the first housing, and a gap having a length and extending from an axially facing surface of the recess of the first housing to a lower surface of the flange of the second housing, the lower surface of the flange providing an upper extent of the gap, and the lower surface of the flange further being contiguous with the contact portion of the second housing such that the contact portion of the second housing and the upper extent of the gap are formed along a common surface and located at the length of the gap away from the axially facing surface of the recess of the first housing, wherein substantially the entirety of said gap between said axially facing surface of the recess and the lower surface of said flange overlaps at least a part of the stator core in the axial direction of said stator core, to be disposed radially outwardly from said part of the stator core, and wherein said second contact point is displaced in said axial direction relative to the axially facing surface of the recess of the first housing by an amount equal to the length of the gap.

* * * * *